ALLEN, RECORD, ROOD & HAYDEN.
Seeder and Cultivator Combined.
No. 101,342. Patented March 29, 1870.
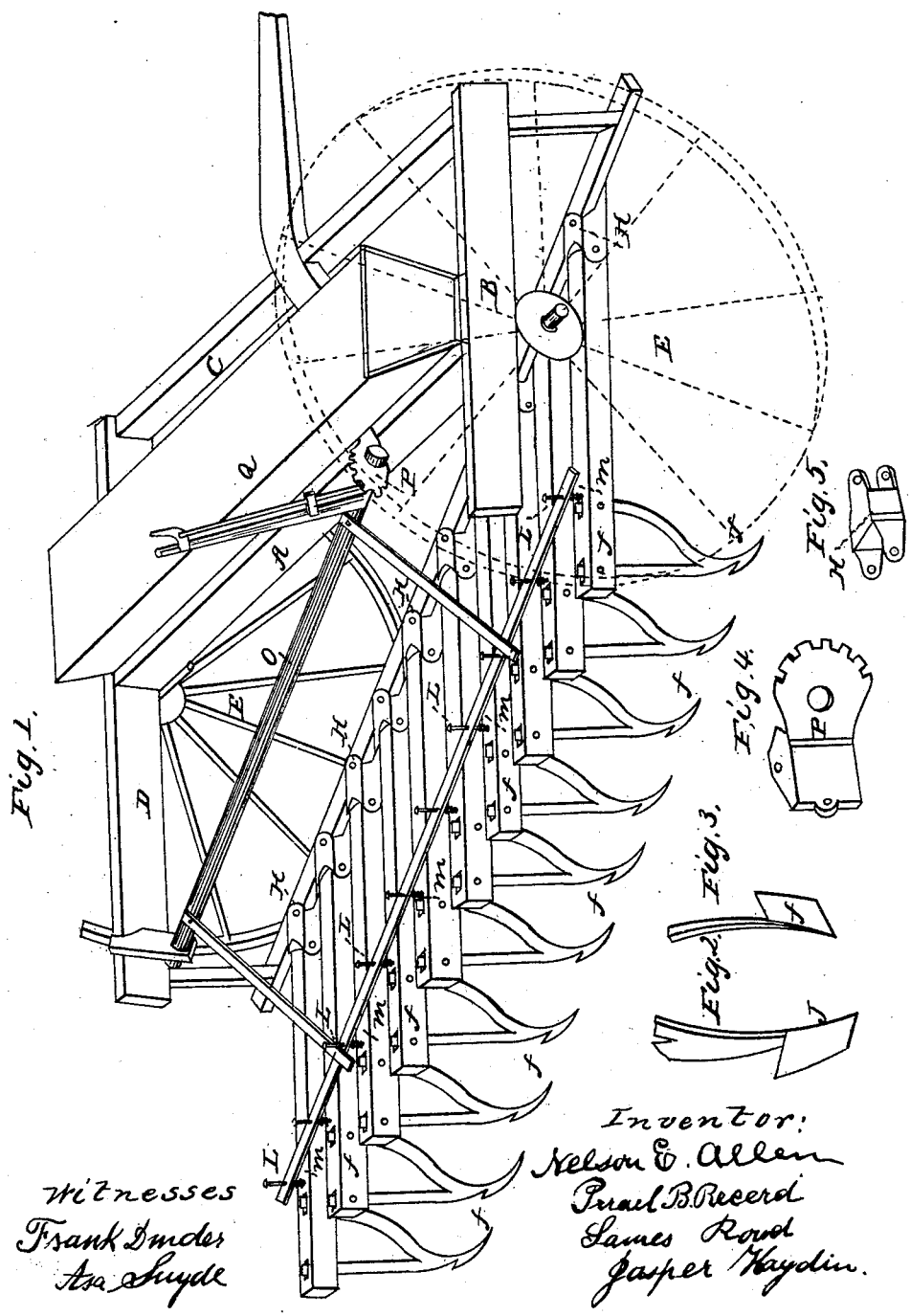

United States Patent Office.

NELSON E. ALLEN, OF TRENTON, AND ISRAEL B. RECORD, JAMES ROOD, AND JASPER HAYDEN, OF BEAVER DAM, WISCONSIN.

Letters Patent No. 101,342, dated March 29, 1870.

IMPROVEMENT IN SEEDER AND CULTIVATOR COMBINED.

The Schedule referred to in these Letters Patent and making part of the same.

We, NELSON E. ALLEN, of the town of Trenton, and ISRAEL B. RECORD, JAMES ROOD, and JASPER HAYDEN, of the city of Beaver Dam, all in the county of Dodge and State of Wisconsin, have invented certain Improvements in Seeders and Cultivators Combined, of which the following is a specification.

Nature and Objects of the Invention.

The first part of our invention relates to the combination of a series of plows or teeth set diagonally to and under the axle of the machine, in such a manner that each succeeding plow or tooth shall turn its mold into the furrow of the preceding one.

The object of this part of our invention is to more thoroughly cultivate the ground, and cover the seed of a more uniform depth, and to such depth as is desired.

The second part of our invention relates to welding or fastening a mold-board to a standard in such a manner that it shall operate like a plow, entirely dispensing with a land-side.

The object of this part of our invention is the lessening of friction and draft.

The third part of our invention relates to a manner of raising and lowering the plows or teeth, and pressing them into the ground.

Description of the Accompanying Drawings.

Figure 1 is a perspective view of the machine in working operation.

Figures 2 and 3 are perspective views of the plows or teeth.

Figure 4 is a perspective view of the casting, which is used to connect the lever to the roll for the purpose of raising and lowering the plows.

Figure 5 represents the clasp or jaw into which the ends of the plow-beams are fastened.

General Description.

The letters A, B, C, and D represent the different parts of the frame, which is supported by the wheels E.

$f$ represents the plow-beams.

G, the cross-bar to which the ends of the plow-beams $f$ are attached, by means of the clasps or jaws H.

The cross-bar G runs diagonally under the center of the axle-tree (which is that part of the frame marked A) to the front end of the cross-piece of the frame marked B, and to the rear end of the cross-piece of the frame marked D, and is attached to each of them permanently, thus setting the plows I in a diagonal position to the axle-tree and the frame, so that each plow shall work independently of the other, and that each plow shall turn its mold into the furrow of the one forward of it.

The plows I are attached to the beams $f$ in any of the common forms.

K is the bar which lies over the plow-beams $f$.

The bolts L pass through the bar K in slots.

The springs M are under and between the bar K and beams $f$, for the purpose of giving a yielding pressure upon the plows, when required, to press them into the ground.

The arms N are attached to the roll O at their upper ends, and to and rest upon the bar K at their lower ends.

P represents the casting or ratchet into which the pawl of the lever Q passes, to hold the plows into the ground, or to raise the plows when required.

Claims.

We claim, as our invention—

1. The series of plows diagonally set and acting independently of each other, the beams of which are pivoted in clasps, and having springs, all constructed and operating as described.

2. The combination of the clasp H, the beams $f$, the springs M, the plows or cultivator I, cross-piece K, arms $n$, the roll O, and lever Q, all constructed and operating as described.

NELSON E. ALLEN.
ISRAEL B. RECORD.
JAMES ROOD.
JASPER HAYDEN.

Witnesses:
ASA SNYDER,
FRANK SNYDER